United States Patent [19]
Camp, Jr.

[11] Patent Number: 6,084,544
[45] Date of Patent: Jul. 4, 2000

[54] METHOD FOR DETERMINING THE LOCATION OF A GPS RECEIVER USING AN ESTIMATED REFERENCE TIME

[75] Inventor: William O. Camp, Jr., Chapel Hill, N.C.

[73] Assignee: Ericsson Inc., Research Triangle Park, N.C.

[21] Appl. No.: 08/993,492

[22] Filed: Dec. 18, 1997

[51] Int. Cl.[7] .............................. H04B 7/185; G01S 5/02
[52] U.S. Cl. ................................ 342/357.15; 342/357.1; 701/214
[58] Field of Search .................................. 455/456, 427, 455/429, 13.1; 342/357.01, 352, 357.03, 357.05, 357.16, 357.02, 357.06, 357.08, 357.15, 357.09, 357.1; 701/214

[56] References Cited

U.S. PATENT DOCUMENTS

| | | | |
|---|---|---|---|
| 5,365,450 | 11/1994 | Schuchman et al. | 364/449 |
| 5,422,813 | 6/1995 | Schuchman et al. | 364/449 |
| 5,436,632 | 7/1995 | Sheynblat | 455/12.1 |
| 5,495,257 | 2/1996 | Loomis . | |
| 5,751,244 | 5/1998 | Huston et al. | 342/358 |
| 5,831,576 | 11/1998 | Sheynblat | 701/215 |

FOREIGN PATENT DOCUMENTS 2 264 837  9/1993  United Kingdom .

OTHER PUBLICATIONS

PCT International Search Report, Apr. 27, 1999, PCT/US 98/26520.

*Primary Examiner*—Theodore M. Blum
*Attorney, Agent, or Firm*—Jenkens & Gilchrist, PC

[57] ABSTRACT

A method for determining the location of a satellite receiver. The method begins by selecting a trial time for use in calculating a presumed location of the receiver using at least four satellites. The presumed location is calculated based on the selected trial time. A first range from the presumed location to a fifth satellite is calculated and a second range from the presumed location to the fifth satellite is measured. A comparison is then made between the first range to the second range. If the first range is unequal to the second range the presumed location is not the actual location. A new trial time is selected and the method is repeated. When the first range and the second range are substantially the same then the presumed location is the actual location.

13 Claims, 3 Drawing Sheets

METHOD FOR DETERMINING THE LOCATION OF A GPS RECEIVER USING AN ESTIMATED REFERENCE TIME

CROSS-REFERENCE TO RELATED APPLICATIONS

This application is related to commonly assigned U.S. patent application Ser. No. 08/950690, entitled: Reduced Global Positioning System Receiver Code Shift Search Space for a Cellular Telephone System, filed Oct. 15, 1997 (inventors William O. Camp, Jr., Kambiz Zangi and Rajaram Ramesh) which is hereby incorporated by reference.

BACKGROUND OF THE INVENTION

1. Technical Field of the Invention

The present invention pertains in general to methods for determining the location of a Global Positioning System (GPS) receiver and, more particularly, to a method for determining the location of a GPS receiver when auxiliary information used for determining the location of the GPS receiver is calculated at a different time than when range measurements are made by the GPS receiver.

2. Description of Related Art

It is desirable, and likely to be mandatory in the near future, that cellular telephone systems be equipped to determine the geographical location of cellular telephones operating within the cellular telephone system. To meet this requirement it has been proposed that cellular telephones be equipped with Global Positioning System (GPS) receivers for determining the location of the cellular telephone. GPS receivers, however, are expensive, increase the cellular telephone size, and consume limited battery power available to the cellular telephone. Furthermore, GPS receivers do not function well within buildings or in other areas where GPS satellite transmissions are weakened due to an obstruction, fading, reflecting, or the like.

It is commonly known that GPS receivers can be made smaller, less expensive, and more energy efficient by eliminating certain GPS receiver functionality used to obtain auxiliary information normally obtained through the demodulation of GPS satellite signals. Instead of demodulating the GPS satellite signals, an alternative means is used to provide the GPS receiver with the needed auxiliary information. This auxiliary information includes various information such as a list of GPS satellites currently in view of the GPS receiver, Doppler shifts for the listed GPS satellites, ephemeris data for each of the listed GPS satellites, and clock correction data for each of the listed GPS satellites. Eliminating the need for the GPS receiver to demodulate the GPS satellite signals also allows the GPS receiver to integrate the GPS satellite signals over a longer period of time allowing for reception of weakened signals due to obstructions.

In order to calculate the auxiliary information for the GPS receiver, however, the approximate location of the GPS receiver must be known. Moreover, the closer the actual location of the GPS receiver to the approximate location used in calculating the auxiliary information the smaller the resulting location search to be performed by the GPS receiver. For example, it is known that if the GPS receiver is given auxiliary information calculated to a location within a radius of one hundred miles of the actual location of the GPS receiver, the GPS receiver need not measure the actual range to the GPS satellites, but instead, only needs to measure a fraction of a millisecond for each of the ranges. This greatly simplifies the necessary range measurements to that of finding the relative code shift position locations to the one millisecond code cycle. In order to do this, however, the GPS receiver still must search all one thousand twenty three code shift positions for all the GPS satellites to be used in the location solution.

The code shift searches can be performed by means of a combination of a fast Fourier transform and an inverse fast Fourier transform correlator to simultaneously search all the code shift positions. This technique for finding the code shift position of a cyclic sequence is described in textbooks, such as *Digital Signal Processing* by Oppenheim & Shafer. While such an approach is more computationally efficient than a straight correlation, it is nonetheless computationally intensive requiring additional functionality and consuming limited battery power resources. Furthermore, with the opportunity to convey information to the mobile unit to assist it in its search for the GPS satellite ranges, this method then becomes computationally inefficient as it consumes computation cycles searching for many code shift positions that are not possible.

Another solution to searching all one thousand twenty three shift code positions is to build specific hardware to search multiple code shift positions simultaneously. To date, however, hardware specific solutions have not been able to simultaneously search more than a fraction of code shift positions thus requiring multiple searches and lengthy time delays.

In the co-pending, co-assigned U.S. patent application Ser. No. 08/950690, entitled: Reduced Global Positioning System Receiver Code Shift Search Space for a Cellular Telephone System, filed Oct. 15, 1997, a method for providing a reduced functionality GPS receiver residing within a mobile station uses auxiliary information calculated for a known geographical location within a cell serving the mobile station. A server connected to a cellular telephone network calculates auxiliary information based upon a known location within the cell served by the cellular telephone base station. In one instance, the auxiliary information includes a list of GPS satellites in view of the base station, Doppler corrections for each of the listed GPS satellites, and code shift positions for each of the listed GPS satellites based upon a universal time coordinated time for the known location. In another instance, the auxiliary information includes a list GPS satellites in view of the base station, location of the center of coverage of the base station, and locations and clock corrections of the listed satellites based upon a universal time coordinated time.

A drawback to this method is that it depends on time synchronization between the GPS satellites and ranging measurements made by the GPS receiver. In many instances, however, the time at which the GPS receiver makes the range calculations varies due to latency in the cellular telephone network. It would be advantageous, therefore, to devise a method for performing range calculations based on auxiliary information absent time synchronization with the GPS satellites.

SUMMARY OF THE INVENTION

The present invention comprises a method for determining the location of a satellite receiver. The method begins by selecting a trial time for use in calculating a presumed location of the receiver using at least four satellites. A presumed location is calculated based on the selected trial time. A first range from the presumed location to a fifth satellite is calculated and a second range from the presumed location to the fifth satellite is measured. A comparison is then made between the first range to the second range. If the first range is unequal to the second range the presumed location is not the actual location and a new trial time is selected and the method is repeated. When the first range and the second range are substantially equal then the presumed location is the actual location.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
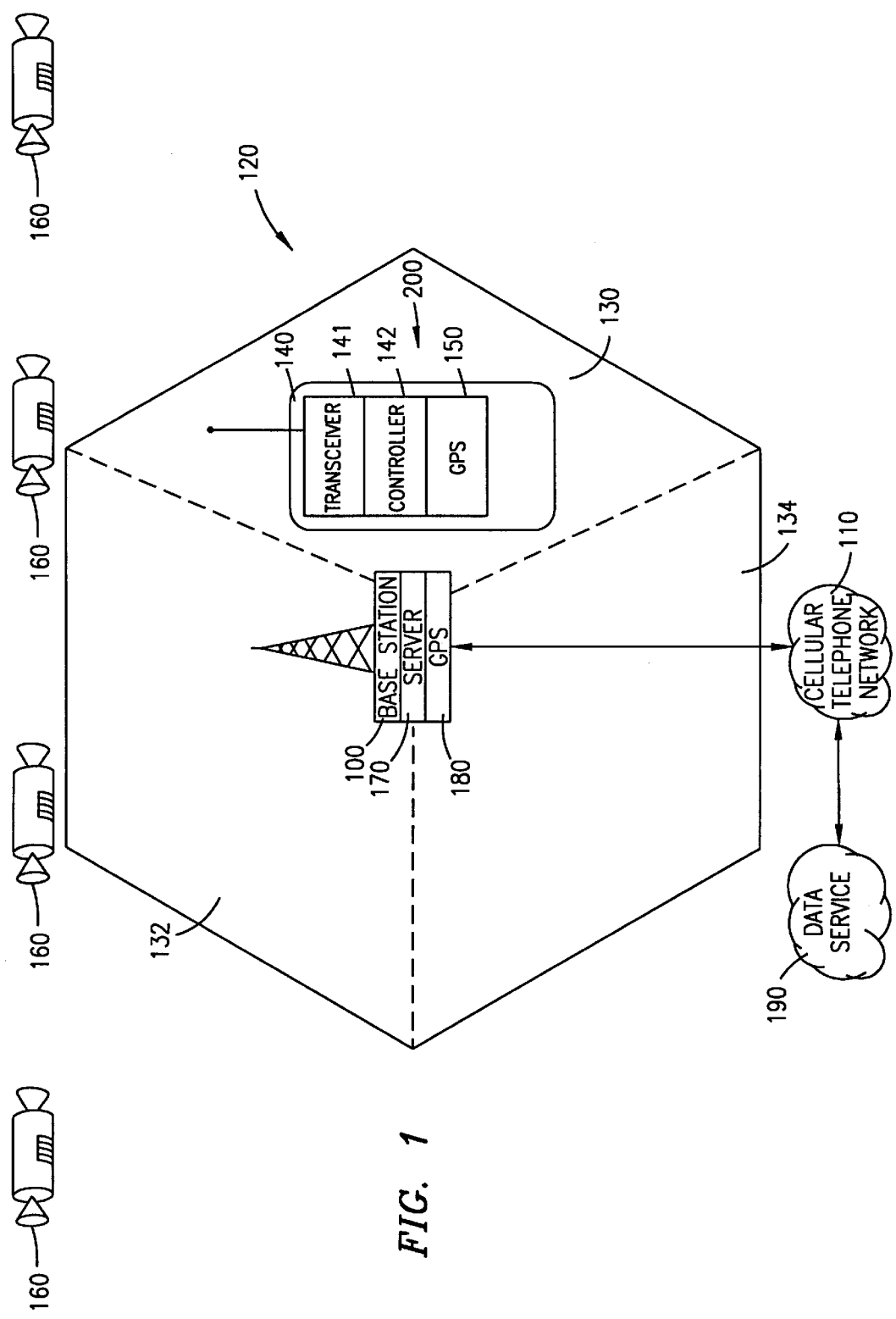
FIG. 1 is a functional block diagram of a system for determining a geographical location consistent with a preferred embodiment of the present invention.

Referring now to FIG. 1 there is illustrated a functional block diagram of a system for determining a geographical location consistent with a preferred embodiment of the present invention. A cellular telephone base station 100 located in a cell site 120 of a cellular telephone network 110 serves a cellular telephone 140. The cell site 120 is divided into a first sector 130, a second sector 132, and a third sector 134, with FIG. 1 illustrating the cellular telephone 140 as being located within the first sector 130. The cellular telephone 140 also includes a reduced functionality GPS receiver 150 which receives GPS satellite transmissions from a plurality of GPS satellites 160. The reduced functionality GPS receiver 150 does not include functionality for demodulating GPS satellite 160 signals and determining auxiliary information. Instead, the auxiliary information necessary for determining location, and which also reduces the range of Doppler frequency shifts and code phase shifts to be searched, is provided to the reduced functionality GPS receiver 150 from an alternate source.

Various different sets of information can be included in the auxiliary information necessary to accomplish a reduction in search space with each having certain advantages and disadvantages. A first set includes a list of the satellites 160 in view of the reduced functionality GPS receiver 140, the Doppler frequencies for the listed satellites 160 and the expected code phase relationships for the listed satellites 160. This information, however, must be delivered with very little latency as the expected code phase relationships for the listed satellites 160 degrades rapidly with time. Also, some form of time synchronization is required to locate the satellites 160 at the time of the measurement.

An alternative set of auxiliary information includes a list of satellites 160 in view of the reduced functionality GPS receiver 140, ephemeris data for the listed satellites 160, clock correction data for the listed satellites 160, an approximate location of the reduced functionality GPS receiver 140 and timing information. In this case, latency of this information is less of an issue and the Doppler frequencies and relative code phases between the satellite signals can be calculated. The time information, however, needs to be known to within several seconds for an efficient search and measurement of pseudo ranges. For example, the time information needs to be known within 10 milliseconds to solve for location as the satellites 160 need to be located accurately at the exact time of measurement. Time information can be obtained from a time standard, internal clock or the cellular telephone network. Time information can also be obtained from GPS signals, but additional functionality would need to be included in the reduced functionality GPS receiver in order to perform demodulation of the GPS signals.

A third set of auxiliary information includes a list of the satellites 160 in view of the reduced functionality receiver 140, location data and motion data for the listed satellites 160, clock corrections for the listed satellites 160 and the approximate location of the reduced functionality GPS receiver 140. This set of auxiliary information concerning the location of the satellites 160 at a known time and their short term motions substitutes for the conventional ephemeris and time information. Using this set of auxiliary information and the method of the present invention for locating the reduced functionality GPS receiver, up to sixty seconds of latency can be tolerated for a rapid signal search and measurement. In all cases above, the addition of differential GPS corrections is possible.

The known location is either the location of the base station 100 or, alternatively, the center 200 of the sector 130 in which the cellular telephone is located. The known location within the coverage area of base station 100 is used to calculate the auxiliary information. The location can be determined by any method including the use of a GPS receiver 180 located at the base station 100 or at a server 170 which calculates the auxiliary information.

The base station 100 obtains and periodically updates GPS ephemeris information and clock corrections pertaining to the current status of the GPS satellites 160. In a preferred embodiment, the GPS ephemeris information and clock corrections are obtained by the base station 100 from a data service 190 via the cellular telephone network 110. Alternatively, the information can be obtained directly from GPS satellite 160 transmissions received by GPS receiver 180 located at the base station 100 or at the server 170.

In the future, when an ancillary GPS related system known as Wide Area Augmentation System (WAAS) becomes operational, the GPS receiver 180 located at the base station 100 or at the server 170 will also be capable of obtaining differential correction information. The differential correction information allows GPS receivers to calculate their location with a higher degree of accuracy.

The server 170, located either at the base station 100 or at a remote location, uses information obtained from either the GPS receiver 180 or the data service 190 to calculate auxiliary information which is subsequently communicated to the base station 100 and transmitted to the reduced functionality GPS receiver 150 located within the cellular telephone 140. The auxiliary information includes, for example, a list of GPS satellites 160 in view of the base station 100, clock correction information, the three dimensional coordinates for the location of each of the listed GPS satellites 160 corresponding to the most probable time that the reduced functionality GPS receiver will make range measurements, the three dimensional velocities and trajectories of each of the listed GPS satellites 160 and the three dimensional coordinates of the known location used to calculate the auxiliary information. A Doppler frequency is calculated for each of the listed GPS satellites 160 using the velocity information. The expected code phase shift for each of the listed GPS satellites 160 is calculated using the location of the satellites 160, the position of the known location, and the clock correction data. Alternatively, the auxiliary information includes a list of GPS satellites 160 in view of the base station 100, clock correction information, ephemeris data for each of the listed GPS satellites 160 and the three dimensional coordinates of the known location used to calculate the auxiliary information.

If the cell site 120 is divided into multiple sectors and the base station 100 can determine the sector in which the cellular telephone 140 is operating, in this example the first sector 130, the server 170 calculates the auxiliary information based on a central location 200 of the sector 130 as opposed to the center of the cell 120. Calculating the auxiliary information based on the center location 200 increases the accuracy of the auxiliary information since there is a greater probability that the cellular telephone 140 is located closer to the center location 200 than the base station 100 at the center of the cell. The geographical coordinates for the center location 200 need not be at the actual center of the sector 130, but instead, can be at a location where cellular telephones are most likely to be located, for example at a shopping mall, office complex, airport, or sporting facility located with the sector. If, however, the cell site 120 is not divided into multiple sectors or if the base station 100 cannot determine the sector in which the cellular telephone 140 is operating, the auxiliary information is calculated based on the geographical location of the base station 100.

In an alternative embodiment, the geographical center location of a Business Transaction Area or Metropolitan Service Area is used instead of the geographical location of the base station 100. Every cellular telephone service area is identified in a System ID (SID) which is read by the cellular telephone 140. The cellular telephone 140 can either store auxiliary information pertaining to these locations and reference the information associated with the current SID or the auxiliary information is stored in the server and 170 and the cellular telephone provides the SID to the server 170 which provides the auxiliary information.

After the server 170 calculates the auxiliary information, the base station 100 transmits the auxiliary information to the reduced functionality GPS receiver 150 in the cellular telephone 140. The auxiliary information can be transmitted to the reduced functionality GPS receiver 150 in a variety of ways. For example, in a cellular telephone network using the Global System for Mobile communications protocol (GSM), information can be sent via a short messaging service message, packet data message sent over a traffic channel, or a broadcast message over a control channel. The auxiliary information is sent in a manner consistent with methods commonly known in the industry for the transmission of information between the cellular telephone network 110 and the cellular telephone 140. A transceiver 141 located within the cellular telephone 140 receives the transmissions from the base station 100 and a controller 142, also located within the cellular telephone 140, identifies the information as auxiliary information and provides the reduced functionality GPS receiver 150 with the auxiliary information. Furthermore, the auxiliary information can be transmitted either on demand to a specific cellular telephone or to a plurality of cellular telephones via a broadcast channel.

Figure 2:
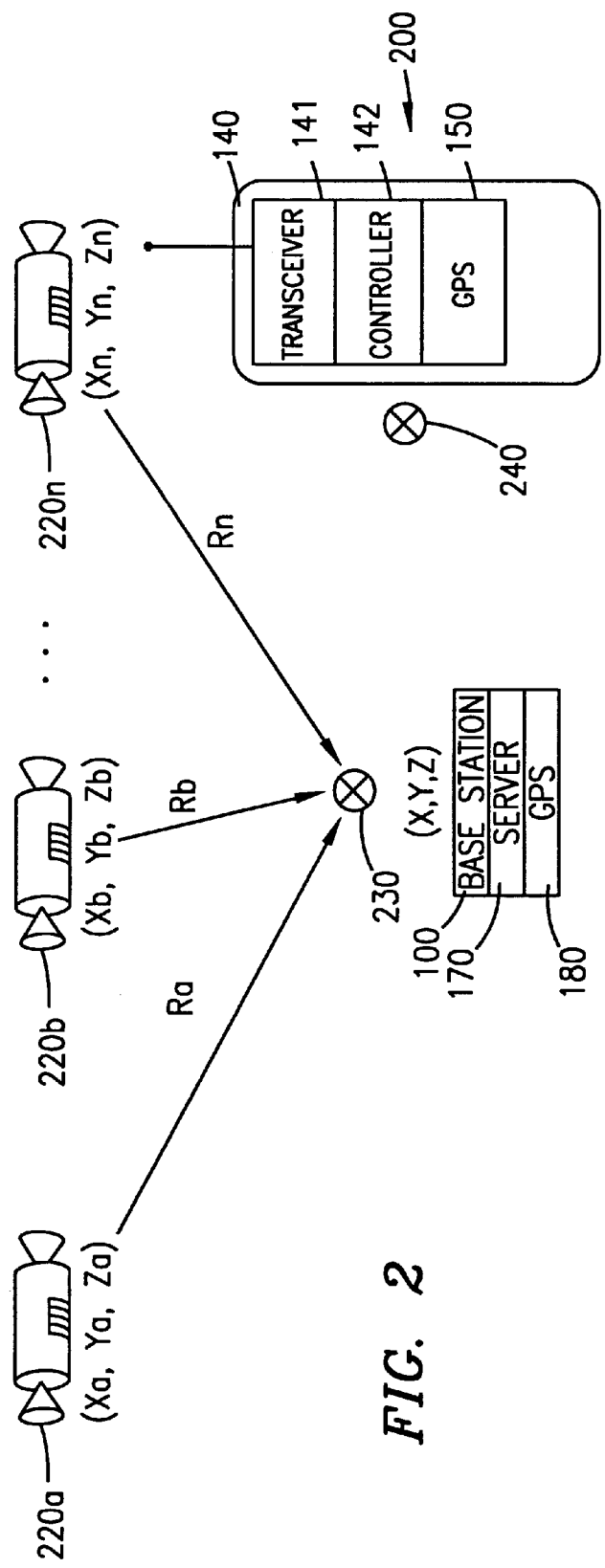
FIG. 2 depicts a plurality of GPS satellites and a known and unknown location illustrating an example for determining a geographical location consistent with a preferred embodiment of the present invention.

Referring additionally now to FIG. 2, there is illustrated a plurality of GPS satellites $220_{a\text{-}n}$, a known location 230 and an unknown location 240 illustrating an example for determining a geographical location consistent with a preferred embodiment of the present invention. Each of the GPS satellites $220_{a\text{-}n}$ listed in the auxiliary information has a set of three dimensional coordinates ($X_{a\text{-}n}$, $Y_{a\text{-}n}$, $Z_{a\text{-}n}$). It is customary to use an Earth centered Earth fixed system for all coordinates. The known location 230 also has a set of three dimensional coordinates (X,Y,Z). A range $R_{a\text{-}n}$ to each GPS satellite $220_{a\text{-}n}$ from the known location 230 is calculated by the expression:

$$R_{a-n} = \sqrt{((X_{a-n} - X)^2 + (Y_{a-n} - Y)^2 + (Z_{a-n} - Z)^2)}$$

Using the auxiliary information, the reduced functionality GPS receiver 150 calculates a code shift position for each satellite $220_{a\text{-}n}$ consistent with a manner known in the industry utilizing a known value for the speed of light, and the individual clock correction values for each satellite. The reduced functionality GPS receiver 150 also searches the code shift search space for each of the GPS satellites $220_{a\text{-}n}$ to determine a measured code shift position for each of the GPS satellites $220_{a\text{-}n}$. The measured code shift positions are subtracted from the calculated code shift positions to calculate ranges to each GPS satellite $220_{a\text{-}n}$. A vector of these delta ranges, multiplied by the inverse of the matrix of unit vector cosines from the known location to each GPS satellite $220_{a\text{-}n}$, yields a correction vector corrections for X, Y and Z which are added to the known location 230 to determine the unknown location 240.

Figure 3:
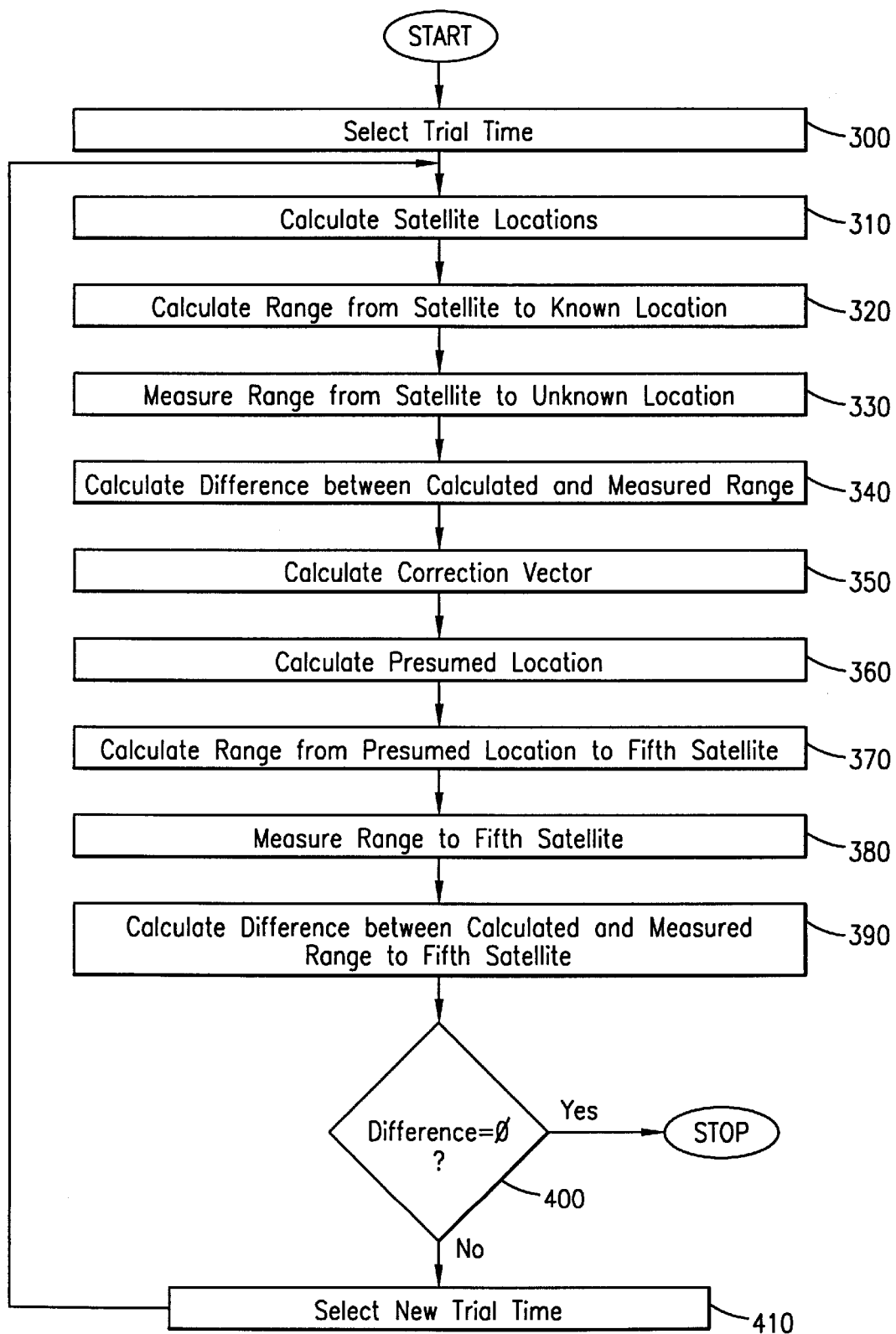
FIG. 3 is a flow diagram of a method for determining a geographical location consistent with a preferred embodiment of the present invention.

Referring now to FIG. 3 there is illustrated a flow diagram of a method for determining a geographical location consistent with a preferred embodiment of the present invention. After the auxiliary information is received by the reduced functionality GPS receiver, the three dimensional location coordinates of at least four GPS satellites are calculated (step 300). If the auxiliary information included the coordinates of the GPS satellites and their velocities and trajectories at time $T_0$, a location of the GPS satellites for the current time $T_1$ is calculated by multiplying their velocities by time and calculating a distance traveled along their trajectories during the period between time $T_0$ and $T_1$. If, on the other hand, the auxiliary information instead included ephemeris data, the location of the GPS satellites is calculated in manner well known and commonly used in GPS receivers.

A range from the GPS satellites to the known location is calculated using the expression described in FIG. 2 (step 320) and a range from the GPS satellites to the unknown location is measured using the code shift measurement also described in FIG. 2 (step 330). A difference between the calculated and the measured ranges is calculated (step 340) and a correction vector is calculated (step 350) as described in FIG. 2. A presumed location is calculated by adding the correction vector to the known location (step 360). At this point, the location is only presumed because the exact time reference to the GPS satellites is only a trial estimate. Therefore, the presumed location needs to be verified.

To verify that the presumed location is the actual location, a range from the presumed location to a fifth GPS satellite in the list of satellites in view of the receiver is calculated (step 370) and a range from the presumed location to the fifth GPS satellite is measured (step 380). The difference between the calculated and measured range between the presumed location and the fifth GPS satellite is calculated (step 390) and a determination is made as to whether the presumed location is the actual location (step 400). If the difference between the calculated and measured range is zero, the presumed location is the actual location. If, on the other hand, the difference between the calculated and measured range is not zero, the selected time is step 300 was incorrect and the presumed location is incorrect. In this case, a new trial time is selected (step 410) and the process repeats beginning at step 310. After a selection of two incorrect trial times, a determination is made as to which direction to move in time when selecting a third trial time and any search routine can be used in identifying the correct reference time.

It is presumed that one can apply higher order corrections to the orbital motion based on an assumed circular orbit. This enables a simple quadratic correction to the satellite location calculations. The net effect of this is to make this method useful out to several minutes of uncertainty in time of pseudo range measurement.

Although embodiments of the method of the present invention have been illustrated in the accompanying Drawings and described in the foregoing Detailed Description, it is understood that the invention is not limited to the embodiments disclosed, but is capable of numerous rearrangements, modifications and substitutions without departing from the spirit of the invention as set forth and defined by the following claims.

What is claimed is:

1. A method for determining the location of a satellite receiver comprising the steps of:
    calculating satellite auxiliary information based on a known location other than a current unknown location of the satellite receiver;
    transmitting that calculated auxiliary information to the satellite receiver at the unknown location; and
    determining by the satellite receiver of its location by performing the following steps:
        (a) selecting using the auxiliary information for the known location a trial time for use in calculating a presumed location using at least four satellites;
        (b) calculating the presumed location of the satellite receiver based on the selected trial time;
        (c) calculating a first range from the presumed location to a fifth satellite;
        (d) measuring a second range from the presumed location to the fifth satellite;
        (e) comparing the first range to the second range;
        (f) acknowledging the presumed location as the actual current location of the satellite receiver if the first range is substantially equal to the second range; otherwise performing the steps of:
        (g) selecting a new trial time using the auxiliary information for the known location; and
        (h) repeating the process beginning with step (b).

2. The method recited in claim 1, wherein the step of calculating the presumed location comprises the steps of:
    calculating a current location for each of the at least four satellites;
    calculating a third range from each of the four satellites to a known location;
    measuring the third range from each of the four satellites to the unknown location of the satellite receiver;
    calculating a correction vector based on a difference between the calculated third range from each of the four satellites to the known location and the measured third range from each of the four satellites to the unknown location; and
    adding the correction vector to coordinates of the known location.

3. The method recited in claim 2, wherein the step of calculating a correction vector comprises the step multiplying the difference between the calculated range from each of the four satellites to the known location and the measured range from each of the four satellites to the unknown location by the inverse of the matrix of unit vector cosines from the known location to each of the four satellites.

4. The method recited in claim 2, wherein the step of transmitting the auxiliary information comprises the step of transmitting the auxiliary information over a cellular telephone network to the satellite receiver which comprises part of a cellular telephone.

5. The method recited in claim 1, further including the step of receiving auxiliary information comprising:
    a list of satellites in view of the receiver;
    clock correction information;
    original three dimensional coordinates for each of the listed satellites;
    three dimensional velocities and trajectories of each of the listed satellites; and
    three dimensional coordinates of the known location.

6. The method recited in claim 5, wherein the step of calculating a current location for each of the at least four satellites comprises the steps of:
    calculating a time difference between the selected trial time and a time when the three dimensional coordinates for each of the four satellites was determined;
    multiplying the time difference by the velocities of each of the four satellites to determine a distance traveled by each of the four satellites during the time difference; and
    identifying the location of each of the four satellites based on the distance traveled and the trajectories of each of the four satellites.

7. The method recited in claim 1, further including the step of receiving auxiliary information comprising:
    a list of satellites in view of the receiver;
    clock correction information;
    ephemeris data for each of the listed satellites; and
    three dimensional coordinates of the known location.

8. The method recited in claim 7 wherein the step of calculating current locations of the at least four satellites comprises the step of extrapolating the information in the ephemeris data to calculate the current locations.

9. A method, comprising the steps of:
    calculating satellite auxiliary information based on a known location other than a current unknown location of a satellite receiver;
    transmitting that calculated auxiliary information to the satellite receiver at the unknown location;
    utilizing of the auxiliary information by the satellite receiver to determine a trial time for use in calculating a presumed location of the satellite receiver with reference to a group of satellites; and
    verifying of the presumed location with reference to a satellite other than one of the group of satellites to determine an actual location of the satellite receiver.

10. The method of claim 9 wherein the step of transmitting the auxiliary information comprises the step of transmitting the auxiliary information over a cellular telephone network to the satellite receiver which comprises part of a cellular telephone.

11. The method of claim 9 wherein the step of utilizing comprises the step of calculating the presumed location of the satellite receiver based on the selected trial time.

12. The method of claim 9 wherein the step of verifying comprises the steps of:
   calculating a first range from the presumed location to the other satellite;
   measuring a second range from the presumed location to the other satellite;
   comparing the first range to the second range;
   acknowledging the presumed location as the actual current location of the satellite receiver if the first range is substantially equal to the second range.

13. A system, comprising:
   a device at a known location operable to calculate satellite auxiliary information based on that known location;
   a cellular telephone network for communicating that auxiliary information to a cellular mobile station at an unknown location other than the known location of the device; and
   a satellite receiver associated with the cellular mobile station operable to process the auxiliary information to determine a trial time for use in calculating a presumed location of the satellite receiver and cellular mobile station with reference to a group of satellites, and verify the presumed location with reference to a satellite other than one of the group of satellites to determine an actual location of the satellite receiver and cellular mobile station.

* * * * *